US012128573B2

(12) United States Patent
Guo et al.

(10) Patent No.: US 12,128,573 B2
(45) Date of Patent: Oct. 29, 2024

(54) ELECTRICALLY DRIVEN DEVICE

(71) Applicant: Braun GmbH, Kronberg (DE)

(72) Inventors: Tiandong Guo, Beijing (CN); Xinwu Lai, Singapore (CN); Kejin Li, Beijing (CN); Detlef Gleich, Friedrichsdorf (DE); Uwe Fischer, Darmstadt (DE); Bernd Stassen, Idstein (DE)

(73) Assignee: Braun GMBH, Kronberg (DE)

( * ) Notice: Subject to any disclaimer, the term of this patent is extended or adjusted under 35 U.S.C. 154(b) by 0 days.

(21) Appl. No.: 17/361,550

(22) Filed: Jun. 29, 2021

(65) Prior Publication Data

US 2022/0001555 A1 Jan. 6, 2022
US 2024/0009872 A9 Jan. 11, 2024

(30) Foreign Application Priority Data

Jul. 1, 2020 (WO) ................ PCT/CN2020/099802

(51) Int. Cl.
*B26B 19/28* (2006.01)
*B26B 19/04* (2006.01)
*B26B 19/26* (2006.01)

(52) U.S. Cl.
CPC ............ *B26B 19/288* (2013.01); *B26B 19/04* (2013.01); *B26B 19/26* (2013.01)

(58) Field of Classification Search
CPC ....... B26B 19/288; B26B 19/26; B26B 19/04; B26B 19/28; B26B 19/386;
(Continued)

(56) References Cited

U.S. PATENT DOCUMENTS 3,538,604 A 11/1970 Walter et al.
3,714,711 A 2/1973 Daniels
(Continued)

FOREIGN PATENT DOCUMENTS

AT 390393 B 4/1990
CA 2817398 A1 10/2012
(Continued)

OTHER PUBLICATIONS

All Office Actions; U.S. Appl. No. 17/361,580, filed Jun. 29, 2021.
(Continued)

*Primary Examiner* — Ghassem Alie
(74) *Attorney, Agent, or Firm* — Kevin C. Johnson; Andrés E. Velarde

(57) ABSTRACT

The invention relates to an electrically driven device, for example an electric hair removal device, such as a wet or dry shaver, an electric toothbrush or an electric skin treatment device. The electrically driven device comprises a housing having a chassis, wherein the chassis comprises an electric motor having a first drive shaft, a battery unit, and an oscillating body having a second drive shaft. A first longitudinal axis is defined arranged along the second drive shaft, a second longitudinal axis is defined arranged along the first drive shaft, and a third longitudinal axis is defined arranged through the center of the body of the battery unit, wherein the second longitudinal axis and/or the third longitudinal axis are parallel offset to the first longitudinal axis.

19 Claims, 5 Drawing Sheets

(58) Field of Classification Search

CPC ............ B26B 19/3873; B26B 19/3886; B26B 19/016; B26B 19/048; B26B 19/382; B26B 19/3853; B26B 19/10; B26B 19/02; A45D 27/46

USPC .... 30/216, 43.92, 34.1, 346.51, 43.91, 43.9, 30/40.2, 41, 41.36, 43.1, 30.05, 541, 47, 30/43.2; D28/49, 51, 53, 54

See application file for complete search history.

(56) References Cited

U.S. PATENT DOCUMENTS

| | | | | | |
|---|---|---|---|---|---|
| 4,428,117 | A | | 1/1984 | Horii et al. | |
| 4,649,762 | A | * | 3/1987 | Messinger | F16H 21/40 74/42 |
| 4,669,322 | A | * | 6/1987 | Messinger | F16H 21/18 74/42 |
| 4,848,171 | A | * | 7/1989 | Steijger | B26B 19/28 74/519 |
| 5,050,300 | A | | 9/1991 | Miska | |
| 5,193,275 | A | | 3/1993 | Hirokazu et al. | |
| 5,207,731 | A | * | 5/1993 | Bukoschek | B26B 19/288 30/43.7 |
| 5,678,312 | A | | 10/1997 | Watanabe | |
| 5,679,991 | A | | 10/1997 | Wolf | |
| 5,771,580 | A | * | 6/1998 | Tezuka | B26B 19/102 30/45 |
| 6,430,813 | B2 | * | 8/2002 | Muraguchi | B26B 19/02 30/DIG. 1 |
| 6,568,083 | B1 | * | 5/2003 | Taniguchi | B26B 19/10 30/43.2 |
| 2005/0172492 | A1 | * | 8/2005 | Blaustein | B26B 19/04 30/43.92 |
| 2011/0099814 | A1 | * | 5/2011 | Fuerst | B26B 19/382 30/34.05 |
| 2011/0099816 | A1 | * | 5/2011 | Carlucci | B26B 19/06 30/47 |
| 2011/0289777 | A1 | * | 12/2011 | Quan | B26B 19/06 30/43.92 |
| 2018/0085947 | A1 | | 3/2018 | Fischer et al. | |
| 2020/0078151 | A1 | * | 3/2020 | Plotka | A61C 17/222 |
| 2022/0001554 | A1 | | 1/2022 | Guo et al. | |

FOREIGN PATENT DOCUMENTS

| | | | | | |
|---|---|---|---|---|---|
| CN | 1525720 | A | | 9/2004 | |
| CN | 201109129 | Y | | 9/2008 | |
| CN | 101448611 | A | | 6/2009 | |
| CN | 202637169 | U | | 1/2013 | |
| CN | 203331055 | U | * | 12/2013 | B26B 19/3873 |
| CN | 206733070 | U | | 12/2017 | |
| CN | 110039577 | A | | 7/2019 | |
| CN | 110176809 | A | * | 8/2019 | B26B 19/3873 |
| DE | 3912090 | C1 | | 8/1990 | |
| EP | 0151971 | A2 | | 8/1985 | |
| EP | 1162721 | A2 | | 12/2001 | |
| EP | 3025833 | A1 | | 6/2016 | |
| JP | S5456565 | A | | 5/1979 | |
| JP | S05754354 | U | | 3/1982 | |
| JP | S61220687 | A | | 9/1986 | |
| JP | S062130574 | U | | 8/1987 | |
| JP | S62201180 | A | | 9/1987 | |
| JP | S6250561 | U | | 5/1991 | |
| JP | H0615872 | A | | 1/1994 | |
| JP | H07185151 | A | | 7/1995 | |
| JP | H1015259 | A | * | 1/1998 | B26B 19/3853 |
| JP | H10156067 | A | | 6/1998 | |
| JP | H10211370 | A | * | 8/1998 | B26B 19/3853 |
| JP | 2001009176 | A | * | 1/2001 | B26B 19/288 |
| KR | 20080005826 | U | | 12/2008 | |
| KR | 20180031699 | A | | 3/2018 | |
| WO | 2007131579 | A1 | | 11/2007 | |
| WO | 2012124459 | A1 | | 9/2012 | |

OTHER PUBLICATIONS

PCT Search Report and Written Opinion for PCT/CN2020/099802 dated Mar. 26, 2021, 9 pages.

PCT Suppl. Search Report and Written Opinion for PCT/CN2020/099802 dated Oct. 14, 2022, 05 pages.

* cited by examiner

Section A - A

ELECTRICALLY DRIVEN DEVICE

FIELD OF THE INVENTION

The present invention is concerned with an asymmetric assembly of an electrically driven device, for example an electric hair removal device, such as a wet or dry shaver, an electric toothbrush or an electric skin treatment device. More precisely, the electrically driven device with an electric motor, a battery unit and an oscillating body with a second drive shaft, for example to actuate a cutter unit, comprises a parallel offset between the electric motor and/or the battery unit and the second drive shaft of the oscillating body.

BACKGROUND OF THE INVENTION

DE 32 24 223 A1 discloses an electrically driven shaver having a centrally located motor and two batteries which are arranged side by side with the motor. The motor and the batteries are directly received and fixed in an outer housing of the shaver. The central location of the motor may have advantages in keeping the drive mechanism simple. On the other hand, the provision of two batteries located next to the motor makes the design of the shaver bulky.

Another example of a centrally located motor in an electric shaver is shown in EP 2 024 147 B1, where the battery may be located on the axially opposite end of the motor, i.e. on the side facing away from the cutter unit. This increases the length of the shaver housing.

Further, EP 2 024 147 B1 discloses a swing bridge for converting a rotary motion into an oscillating motion. This known swing bridge can be used in an electrically driven device such as a dry shaver.

The swing bridge comprises an oscillating body with a coupling, a drive shaft and two swing arms. The coupling comprises a slot for coupling an eccentrically rotatable drive pin coupled to a drive shaft of an electric motor to the swing bridge. Further, the drive shaft of the oscillating body may be coupled to a cutter unit, wherein the two drive shafts, i.e. the drive shaft of the electric motor and the drive shaft of the oscillating body, are arranged in a common plane running through the slot. The swing arms can be coupled to a housing of an electrically driven device. Thus, during use of an electrically driven device, the oscillating body of the swing bridge is only free to move in a linear direction between the two swing arms. The swing bridge, therefore, converts a rotary motion of a drive pin into a linear oscillating motion of the drive shaft.

The alignment of the drive shafts in a common plane may have drawbacks regarding the assembly of an electrically driven device, as the drive shaft of the electric motor has to be arranged in line with the drive shaft of the swing bridge. Thus, this may lead to an unused space within the housing as well as an uneven weight distribution in relation to the drive shafts, when a battery unit is arranged aside from the electric motor.

SUMMARY OF THE INVENTION

It is an object of the present disclosure to provide an electrically driven device with a housing comprising a chassis, wherein the chassis is adapted to receive an electric motor, a battery unit and an oscillating body, improving the required space needed for assembly as well as the overall weight distribution in relation to the drive shaft of the oscillating body.

An electrically driven device as defined in claim 1 solves this object.

According to claim 1, the electrically driven device comprises a housing with a chassis, wherein the chassis comprises a plastic skeleton being provided with an electric motor having a first drive shaft, a battery unit, and an oscillating body having a second drive shaft. Further, a first longitudinal axis is defined arranged along the second drive shaft, a second longitudinal axis is defined arranged along the first drive shaft and a third longitudinal axis is defined arranged through the center of the body of the battery unit, wherein the second longitudinal axis and/or the third longitudinal axis are parallel offset to the first longitudinal axis.

DETAILED DESCRIPTION OF THE INVENTION

Preferably, the electric motor comprises a first drive shaft which may be centered with respect to the motor and may be mechanically coupled to the oscillating body via an eccentric drive pin. The oscillating body may be part of a swing bridge. The feature of the “swing bridge” may also be named “oscillation bridge” hereinbelow. Hence, upon actuation, i.e. upon rotation, of the first drive shaft the oscillating body and therefore the second drive shaft is oscillating. Each of the two drive shafts is running along a longitudinal axis, i.e. a first and a second longitudinal axis. The oscillating body may define a plane that extends in two directions perpendicular to the longitudinal axes, i.e. in two transverse directions. Preferably, the oscillating body oscillates substantially in one of those transverse directions perpendicular to the longitudinal axes, i.e. in one direction of the plane. Further, the third longitudinal axis is running through the center of the body of the battery unit. If there are multiple battery units, the third longitudinal axis is preferably given by a point averaged from the several centers of the body or each of the battery units comprise a own longitudinal axis running through its center of the body, i.e. there are multiple third longitudinal axes. Preferably, the second and/or the third longitudinal axis are parallel offset to the first longitudinal axis in at least one of the transverse directions defined by the plane. Moreover, if the offset is only given in one transverse direction, this direction is preferably the direction of the oscillating motion of the oscillating body. Furthermore, there may be embodiments, wherein at least one of the longitudinal axes is not only offset parallel but also tilted.

In one embodiment, the second longitudinal axis and the first longitudinal axis and the third longitudinal axis and the first longitudinal axis are offset by a different offset distance. This means that the parallel offset between the first longitudinal axis and the second axis is different in distance than the offset between the first longitudinal axis and the third longitudinal axis. It may also be possible, that the first longitudinal axis and for example the second longitudinal axis are offset parallel only in one transverse direction, wherein the first longitudinal axis and the third longitudinal axis are offset parallel and two transverse directions or vice versa. In this case, the offset distances pointing in the same transverse direction are compared, i.e. have to differ. However, the first longitudinal axis, which is running through the second drive shaft of the oscillating body, is preferably substantially arranged along an axis running through the center of the body of the electrically driven device. Consequently, the second drive shaft as it is preferably oscillating in one transverse direction, is substantially oscillating about the axis running through the center of the body of the electrically driven device.

In a preferred embodiment, the second longitudinal axis and the third longitudinal axis are offset from the first longitudinal axis in opposite transverse directions. In consideration of the second drive shaft substantially oscillating about the first longitudinal axis, the second longitudinal axis, i.e. the first drive shaft of the electric motor, is parallel offset in at least one transverse direction and the third longitudinal axis is parallel offset in an opposite transverse direction. If one of the second or third longitudinal axis is parallel offset to the first longitudinal axis in two transverse directions, and the other longitudinal axis is only parallel offset to the first longitudinal axis in one transverse direction, the term 'opposite transverse direction' means that one of the two transverse directions is opposite to the one transverse direction. The same accounts if both, the second and third longitudinal axes, are parallel offset in two transverse directions. Even though, the second and third longitudinal axes are parallel offset in opposite transverse directions with different offset distances, it is preferred if the displacement of the second and third longitudinal axis in the oscillation direction of the oscillation body is such that the outermost part of the electric motor in the oscillation direction and the outermost part of the battery unit in the oscillation direction are substantially equidistant from the first longitudinal axis.

Further, it may be preferred if the housing and/or the chassis each comprise at least two components. This means that either the housing and/or the chassis comprise at least two components. Therefore, it may be preferred if the chassis comprises one component, wherein the housing comprises multiple components or vice versa. It may also be preferred if the chassis is an integral part of the housing or at least one of the housing components. In contrast, the chassis may be coupled to the housing or to at least one of the housing components. Independent of the number of the chassis and/or housing components and independent of the coupling between the chassis and the housing, the chassis is defined as a component for receiving at least the electric motor as well as the battery unit.

Preferably, the at least two components, i.e. the at least two components of the housing and/or the chassis comprise a different material stiffness. Preferably, the chassis comprises one component, wherein the housing comprises multiple components. Screws, hooks, welding or the like may connect the chassis and the housing. Further, the at least two components may differ in other material properties, like strength, hardness, etc. It may also be preferred, if some of the housing components are at least partially overlapping, wherein the overlapping components comprise different material properties. The chassis may be made by 2*k* hard-soft injection molding.

Furthermore, at least one of the housing or the housing components may be formed as one with the chassis or as one with one of the chassis components. Thus, the only difference between the housing components and the chassis or the chassis components may be seen in the fact that the chassis receives at least the electric motor as well as the battery unit as mentioned above.

In one embodiment, the chassis is provided with openings or cavities for receiving the motor and the battery unit side by side and is provided with the PCB at a lateral side, also side by side to one of the motor and the battery unit. The chassis with its skeleton comprises at least an upper wall (a lower wall, a rear wall and a front wall, wherein the front or the rear wall comprise openings or cavities for receiving the battery unit and the motor and wherein the PCB is fixed at a lateral side of the chassis. Preferably, the front wall is at least partially open as this provides easy access to the inner part of the chassis and thus, facilitates the assembly. In addition, a closed rear wall or an at least partially closed rear wall improves the stiffness of the chassis. It may also be preferred, if additional design measures such as crossbars are taken to increase the stiffness of the chassis. It should be also noted that an at least partially open front or rear wall also includes a fully open front or rear wall, i.e. a chassis without a front or rear wall. Further, the chassis may comprise an additional element such as a wall-type element in between the electric motor and the battery unit. This wall-type element may secure the electric motor and/or the battery unit and may also stiffen the chassis.

Further, the second drive shaft may be adapted to be mechanically coupled to at least one cutter unit. The at least one cutter unit may comprise at least a slit cutter, wherein the slit cutter comprises at least an outer blade, preferably a foil-type blade, and an inner blade. Preferably, an oscillation of the inner blade is caused by the oscillation of the second drive shaft of the oscillating body. As the second drive shaft may oscillates substantially about an axis running through the center of the body of the electrically driven device, a unit, such as a cutter unit, attached to the drive shaft may be substantially centrically driven.

In one embodiment, the electric motor comprises a drive pin rotatable eccentrically about the second longitudinal axis, wherein the drive pin is adapted to be mechanically coupled to the oscillating body. More precisely, the eccentrically rotatable drive pin is coupled to or formed as one with the first drive shaft. Moreover, the eccentrically rotatable drive pin may be coupled to a slot or groove or the like of the oscillating body, wherein the slot may be an elongated hole and wherein the slot or the groove has its smaller widening in a transverse direction of the electrically driven device and preferably in the transverse direction, which is equal to the direction of oscillation of the oscillating body. Consequently, a rotation of the eccentrically rotatable drive pin pushes the oscillating body back and forth in a transverse direction.

Preferably, the housing and/or the chassis comprises attachment means, preferably press ribs, to secure the motion of the oscillating body in at least one direction. Therefore, the housing and/or the chassis may comprise attachment means on a side wall of the chassis and/or the housing but may also comprise attachment means on the above mentioned wall-type element separating the electric motor and the battery unit. Furthermore, as mentioned above, the oscillating body may be part of a swing bridge, wherein the oscillating body further comprises two webs or wings extending at least substantially perpendicular to the above-mentioned plane of the oscillating body. The two webs may have free ends facing away from the oscillating body. Thus, the attachment means may secure those free ends, wherein an oscillating motion of the oscillating body bends the two webs. In order to secure the free ends within the press ribs, the free ends of the webs may be pressed into press ribs, whereupon optionally hot staking melts those ribs.

In a preferred embodiment, the housing or at least one of the housing components and/or the chassis or at least one of the chassis components comprise means to secure the electric motor. The chassis or the chassis components preferably form those means in order to provide a form fit. As an alternative, the electric motor may also be affixed to the chassis or to the chassis components by a firmly bonded manner.

In addition, the housing or the housing components and/or the chassis or the chassis components may be formed by injection molding. As a type of plastic material preferably forms the housing or the housing components as well as the chassis or the chassis components, injection molding provides a suitable manufacturing process especially for the manufacturing of large quantities. Obviously, there may exist other manufacturing processes, which may be advantageous depending on the quantities, the type of material as well as the preferred material properties of the components etc.

The electrically driven device may further comprise a cap, wherein the cap is removably attached to the housing or one of the housing components, and wherein the cap is at least covering a button to actuate the electrically driven device. During the use of the electrically driven device, the cap may be removed, while the cap may be attached to the electrically driven device during storage and/or transportation. Thus, during storage and/or transportation the use of a cap can prevent an undesired activation of the device and/or an unwanted dirtying, for example an unwanted dirtying of a dopp kit by cut-off hair. Further, the cap may protect the electrically driven device against any ingress, for example dust ingress, and, therefore, may extend the durability of the electrically driven device.

Furthermore, the electric motor and the battery unit may be sealed against moisture penetration, by seals of at least one of the housing or the housing components and/or the chassis or the chassis components and/or the cap. This is especially required when the electrically driven device is used within a wet environment such as a bathroom. The sealing of the electrically driven device and/or the moisture-sensitive components is effected by common means.

The invention will subsequently be explained in detail with reference to specific embodiments shown in the Figures. All features described and/or shown in the Figures are subject matter of the invention, irrespective of the grouping of the features in the claims and/or their back references.

Figure 1A:
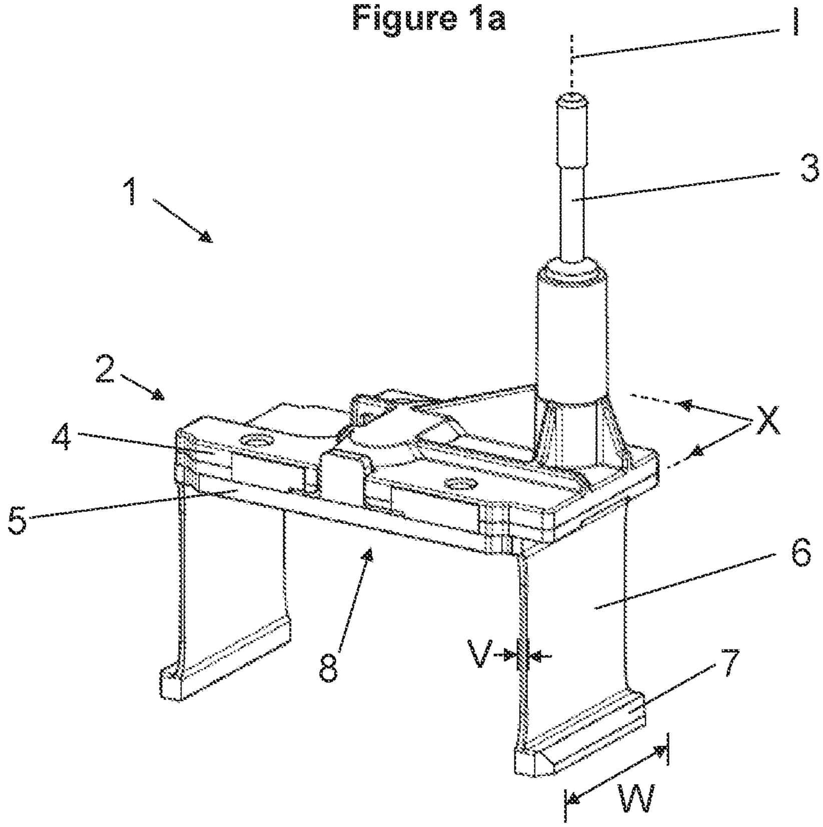
FIG. 1*a* shows a perspective view of a swing bridge.

The swing bridge 1 shown in FIG. 1*a* comprises an oscillating body 2 and a second drive shaft 3. The oscillating body 2 of FIG. 1*a* has an upper first component 4 and a lower second component 5, wherein the first component 4 comprises a different shape than the second component 5. The oscillating body 2 and the respective first and second component 4 and 5 are ultrasonic welded together and define plane X.

The swing bridge 1 further comprises two webs 6 being an integral part of the second component 5 of the oscillating body 2. The two webs 6 each have a free end 7 facing away from the oscillating body 2. To be bendable in a transverse direction of an electrically driven device (not shown), the webs 6 comprise in general a smaller material strength or thickness V compared to their width W.

The width W of the webs 6 shown in FIG. 1*a* is a bit smaller than the width of the components 4 and 5 of the oscillating body 2. Additionally, the width W of the webs 6 between the oscillating body 2 and the free end 7 can differ. Further, the free ends 7 of FIG. 1*a* have protrusions facing away from the oscillating body 2 for securing the swing bridge 1.

Figure 2:
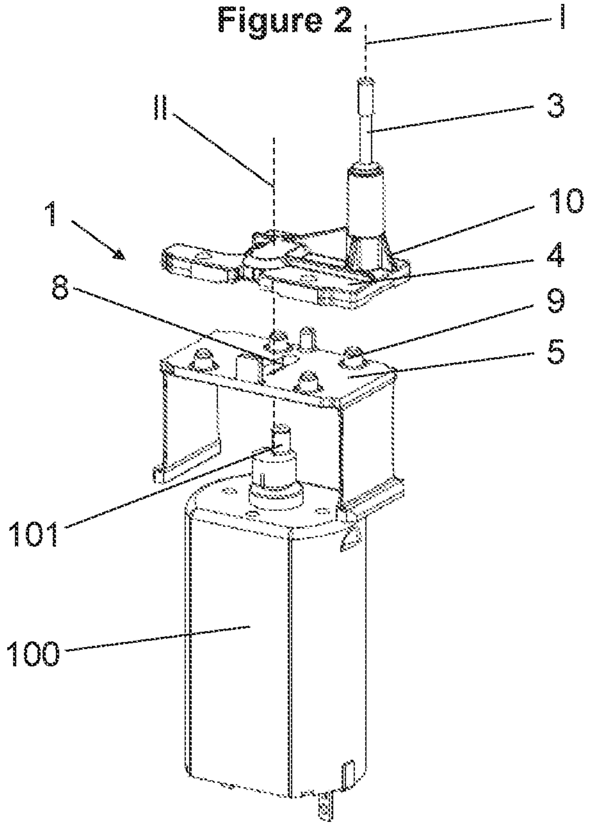
FIG. 2 shows an exploded view of the components of the swing bridge of FIG. 1*a* together with an electric motor.

Furthermore, the second component 5 of the swing bridge 1 has a slot 8 (shown in FIG. 2). The second drive shaft 3 is overmolded within a corner section of the first component 4 and runs along a first longitudinal axis I.

Figure 1B:
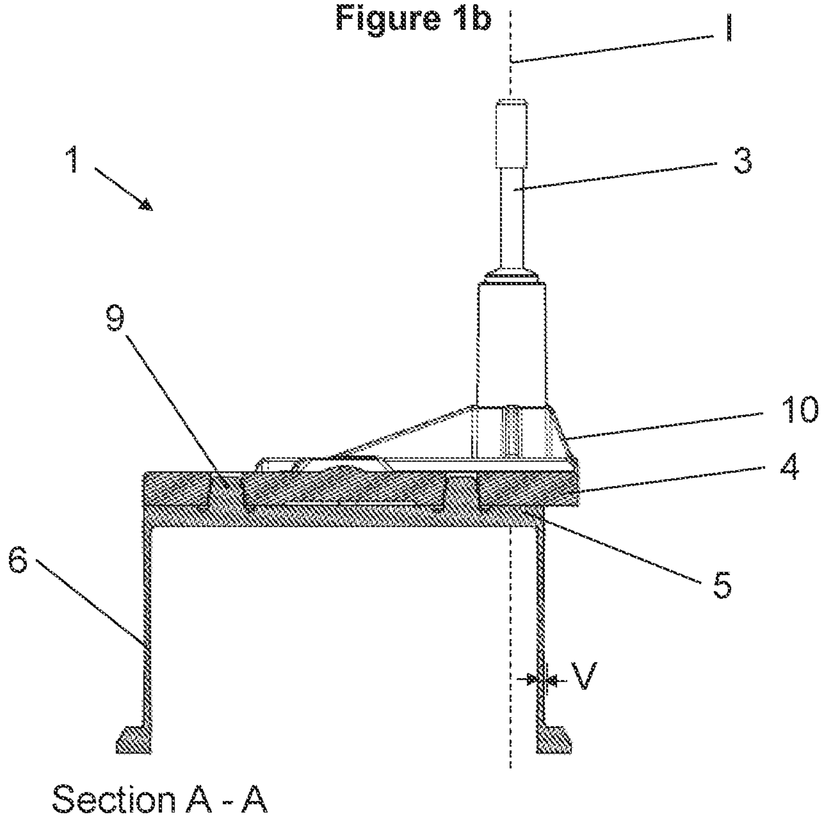
FIG. 1*b* shows a sectional view of the swing bridge of FIG. 1*a* along line A-A in FIG. 1*c;*
Figure 1C:
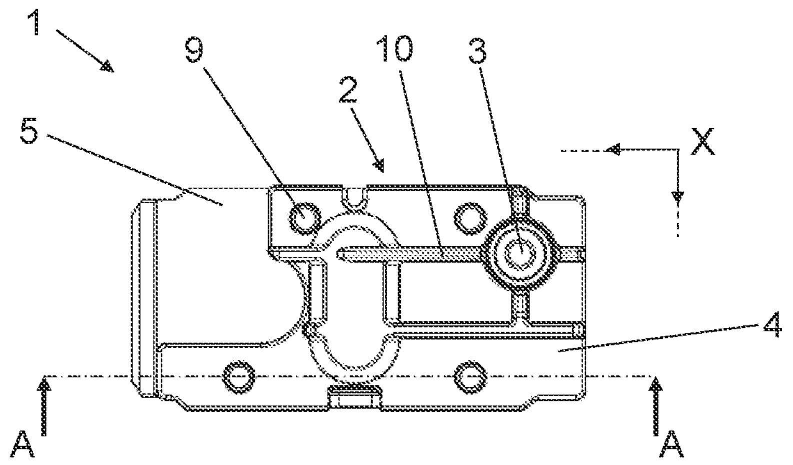
FIG. 1*c* shows a top view of the swing bridge of FIG. 1*a;*

The section A-A of FIG. 1*b* is shown in FIG. 1*c*. Welding dots 9 in FIG. 1*b* are used for ultrasonic welding of the two components 4 and 5 of the oscillating body 2. The first component 4 comprising the second drive shaft 3 protrudes beyond the second component 5 on the side where the second drive shaft 3 is located. Moreover, the overmolding of the second drive shaft 3 comprises ribs 10 for support on the first component 4.

FIG. 1*c* shows a top view of the swing bridge 1. It can be noticed that the first component 4 and the second component 5 are ultrasonic welded by four welding dots 9. Even though, it seems that the swing bridge 1 only comprises one web 1 on the left side, the web on the right side is simply covered by the protruding first component 4 as mentioned before. Further, the second drive shaft 3, which is located in a corner section of the oscillating body 2, is offset in two directions of the plane X, wherein the offset in one transverse direction is bigger than the offset in the other transverse direction of plane X.

Figure 1D:
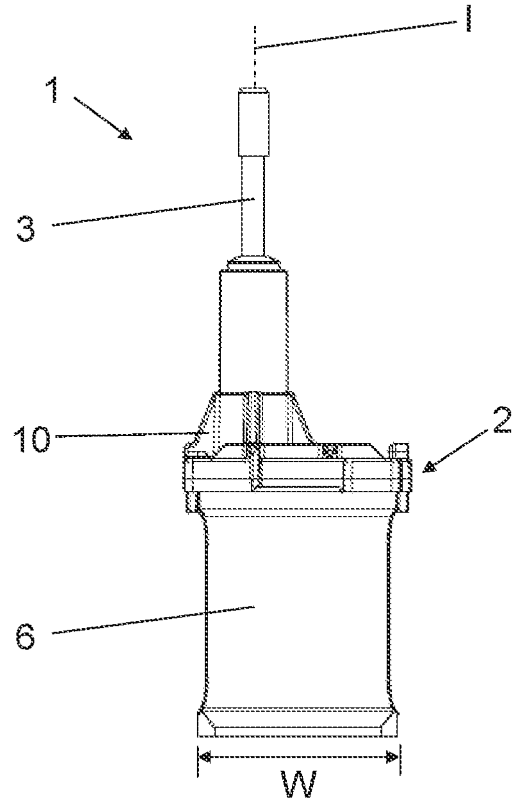
FIG. 1*d* shows a side view of the swing bridge of FIG. 1*a;*

In FIG. 1*d* a side view of the swing bridge 1 is shown, wherein the above-mentioned differing width W of the webs 6 can be noticed. The width W of web 6 is bigger at the free end 7 comprising the protrusion for securing the swing bridge 1.

FIG. 2 shows an exploded view of the swing bridge 1 of FIGS. 1*a* to 1*d* together with an electric motor 100. The second component 5 shows the above-mentioned slot 8. The slot 8 depicted in FIG. 2 is an elongated hole with a smaller widening in the oscillating direction of the swing bridge 1. The electric motor 100 comprises an eccentrically rotatable drive pin 101. Once the swing bridge 1 and the electric motor 100 are assembled, the drive pin 101 extends into the slot 8 of the swing bridge 1. Thus, a rotatable motion of the drive pin 101 can be converted into an oscillating motion of the swing bridge 1. Especially when the swing bridge 1 is secured by the free ends 7 of the webs 6, this oscillating motion is a linear oscillating motion in a transverse direction of an electrically driven device (not shown) (neglecting the deflection in the direction perpendicular to plane X). The drive pin 101 may be coupled to a first drive shaft 103 (shown in FIG. 4*b*) of the electric motor 100 or may be an integral part of the first drive shaft 103. Further, a second longitudinal axis II running along this first drive shaft 103 of the electric motor 100 is depicted. Furthermore, FIG. 2 shows a parallel offset between the first longitudinal axis I and the second longitudinal axis II and, thus, an asymmetric assembly. The two longitudinal axes I and II are parallel offset in two transverse direction of the plane X. In addition, it can be noted that the second longitudinal axis II is running through the center of slot 8.

Figure 3:
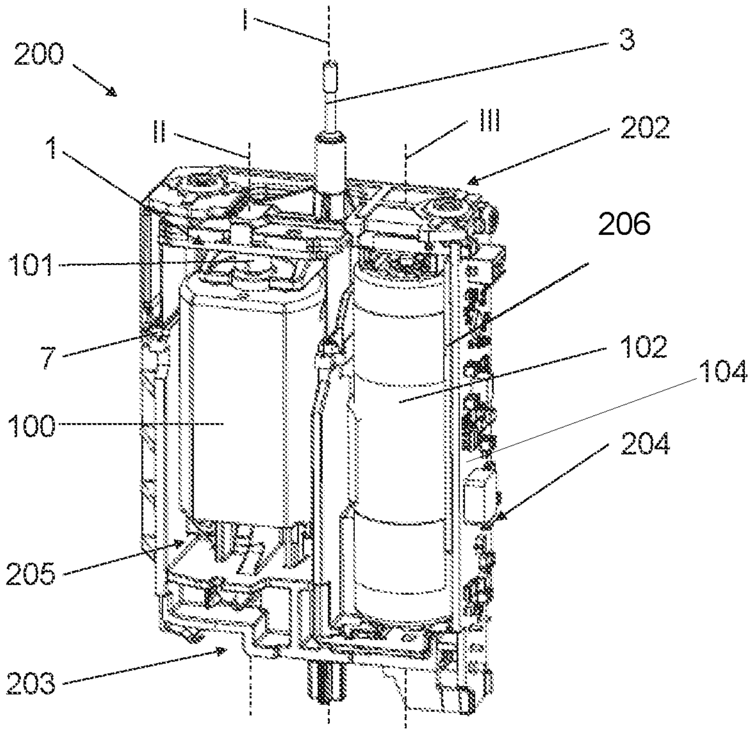
FIG. 3 shows a perspective view of the swing bridge and the electric motor of FIG. 2 arranged within a chassis.

A chassis 200 comprising the assembled swing bridge 1 and an electric motor 100 together with a battery unit 102 is shown in FIG. 3. The chassis 200 is half-open, which means that a front wall 205 of the chassis 200 comprising an upper wall 202, a lower wall 203, a rear wall 204 is cut out. Therefore, the chassis 200 is opened on the front wall 205, which gives easy access to the electric motor 101 and the battery unit 102. In addition, the at least mostly closed rear wall 204 provides additional stiffness to the chassis 200. Additionally or as an alternative, the chassis 200 may be coupled to a housing or may be an integral part of a housing. The battery unit 102 is preferably rechargeable and a third longitudinal axis III runs through its center of the body. Further, the free ends 7 of the swing bridge 1 are secured to the chassis 200. One way to secure the swing bridge 1 to the chassis 200 is to press the free ends 7 of the webs 6 into press ribs of the chassis 200 and to melt those ribs by hot-staking. Once the swing bridge 1 is secured, only a movement of the oscillating body 2 is permitted. Further, due to the big width W of the webs 6 compared to their material strength V, the webs 6 are stiff in the transverse direction showing a smaller extension of the chassis 200, while being flexible in the transverse direction which is equal to the direction of oscillation of the oscillating body 2. Thus, a linear oscillating motion of the swing bridge 1 is caused by a rotatable motion of the drive pin 101 extending into the slot 8 of the oscillating body 2.

Figure 4A:
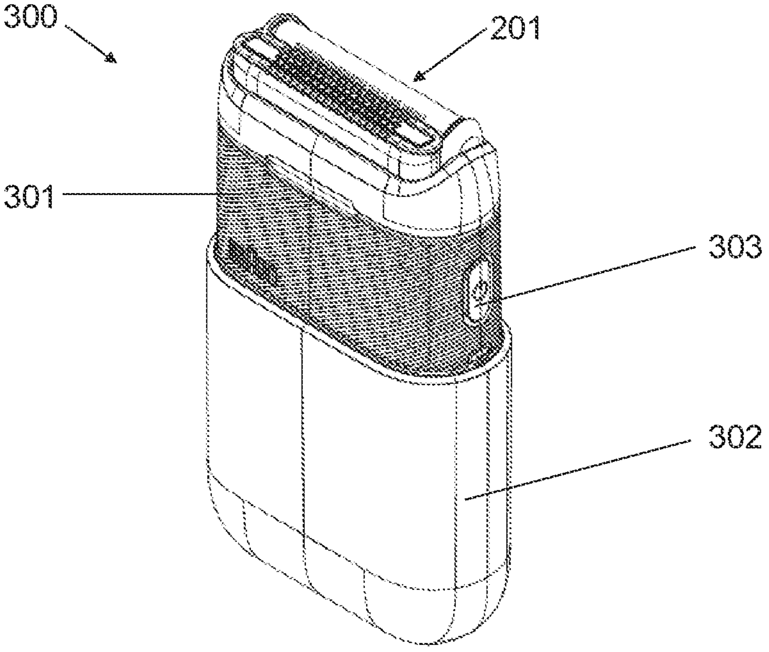
FIG. 4*a* shows a perspective view of an assembled electrically driven device according to an embodiment of the invention.

FIG. 4*a* illustrates an electrically driven device 300 comprising the assembled chassis 200 (not shown) of FIG. 3. The electrically driven device 300, here an electric shaver, comprises an upper housing 301, an outer housing 302, a button 303 and a cutter unit 201. The upper housing 301 includes the button 303. The button 303 is used to actuate the electrically driven device 300.

Figure 4B:
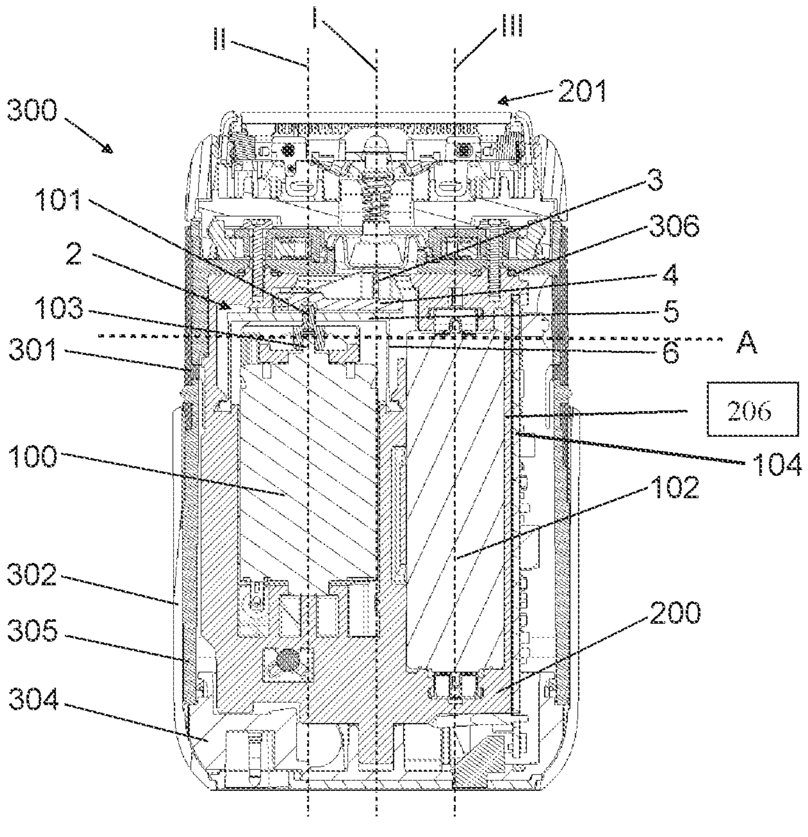
FIG. 4*b* shows a sectional view of the electrically driven device of FIG. 4*a*.

A cross-sectional view of the electrically driven device 300 is shown in FIG. 4*b*. The electrically driven device 300 comprises the chassis 200 and the cutter unit 201. The chassis 200 is fixed within the housing and comprises the swing bridge 1, the electric motor 100 and the battery unit 102. The electric motor 1 is arranged on the left side of the electrically driven device 300 and the battery unit 102 is arranged on the right side of the chassis 200 as seen in FIG. 4*b*. Hence, the assembly of the electric motor 100 and the battery unit 102 is asymmetric according to the second drive shaft 3 of the oscillating body 2.

The electric motor 100 comprises the first drive shaft 103 running along the second longitudinal axis II and an attachable eccentrically rotatable drive pin 101. The drive pin 101 extends into the slot 8 and mechanically couples the electric motor 100 to the swing bridge 1, wherein the swing bridge 1 is secured within an outer and an interior wall of the chassis 200. As can be seen from FIG. 4*b*, the drive pin 101 extends through slot 8 of the second component 5 and protrudes into a recess of the first component 4. Further, the second drive shaft 3 of the oscillating body 2 of the swing bridge 1 running along the first longitudinal axis I is mechanically coupled to the cutter unit 201. Furthermore, the battery unit 102 comprises the third longitudinal axis III running through the center of its body. As can be clearly seen, all three longitudinal axes I, II and III are parallel offset in at least one transverse direction of the electrically driven device 300.

FIG. 4*b* also shows, that the offset distance between the first and the second longitudinal axes I and II is smaller than the offset distance between the first and the third longitudinal axes I and III along with a parallel offset in an opposite transverse direction of the electrically driven device 300 between the first and second longitudinal axes I and II compared to the parallel offset between the first and the third longitudinal axes I and III.

Additionally, the electrically driven device 300 comprises multiple housing parts, i.e. the upper housing 301, the outer housing 302, a lower housing 304 and an inner housing 305. All housing parts 301, 302, 304 and 305 and the chassis 200 are coupled by attachment means such as hooks, screws or the like or some of them may be molded together. Here, upper housing 301 is made from soft plastic/component which is over injection molded onto inner housing 305 which is made from a hard plastic component. Thus, this and optionally other housing/chassis parts is/are made in a 2K injection molding process. The upper housing 301 comprises a softer material than the inner housing 305. In order to prevent the inner component parts of the electrically driven device 300 to be wetted, especially the electric motor 100 and the battery unit 102, the PCB 104, electrical contacts and the chassis are sealed by lower seals 306 and upper seals/o-rings 308. Lower housing 304 is comprised of the housing plastic part, a LED component, charging pins which is all co injection molded as one piece. As shown in FIG. 4*b*, an axis A perpendicular to the first drive shaft 103 of the electric motor 100 passes through the first drive shaft 103 of the electric motor 100, the battery unit 102 and the PCB 104.

Figure 5:
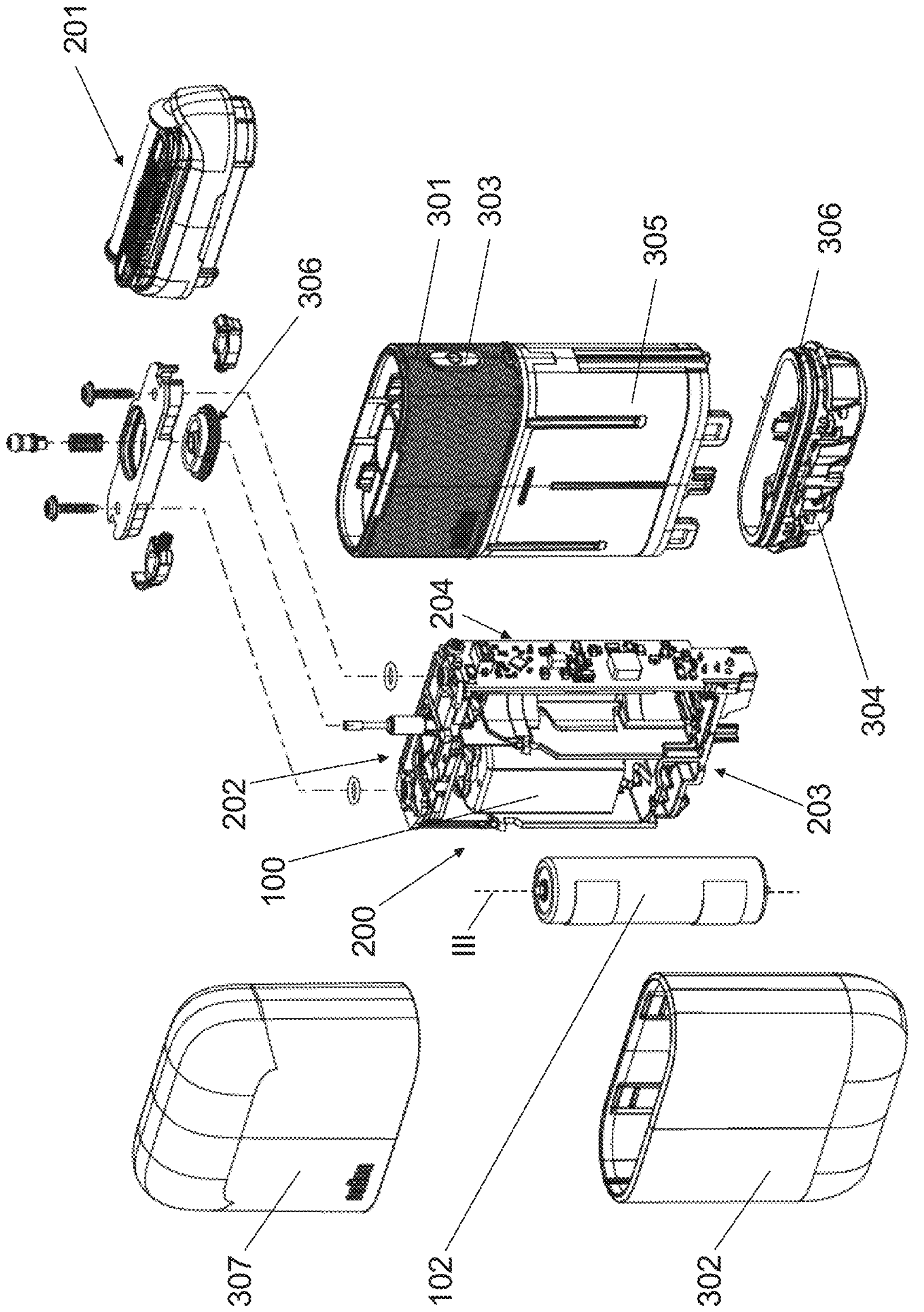
FIG. 5 shows an exploded view of the electrically driven device of FIG. 4*a* together with a cap.

Additional seals 306 can be seen in an exploded view of the electrically driven device 300 in FIG. 5. Furthermore, FIG. 5 shows a cap 307 that can be attached to the electrically driven device 300 during storage and/or transport. The dotted lines in FIG. 5, except for the line demonstrating the longitudinal axis III, demonstrate the way of assembly of some housing components and seals 306 to the chassis 200.

The assembled exemplary electrically driven device 300 with the electric motor 100, the battery unit 102, the swing bridge 1 with the oscillating body 2 and the cutter unit 201 is therefore adapted to convert the rotatable motion of the first drive shaft 103 of the electric motor 100 into a linear oscillation of the second drive shaft 3 and thus to operate the cutter unit 201. Therefore, the swing bridge 1 converts the rotatable motion of the first drive shaft 103 of the electric motor 100 and the respective eccentrically drive pin 101 into a linear oscillating motion of the second drive shaft 3 and thus the cutter unit 103.

When the electrically driven device 300, i.e. the electric motor 100, is actuated by button 303 and the battery unit 102 powers the electric motor 100, the first drive shaft 103 starts rotating. The drive pin 101, which is attached to the first drive shaft 103 converts the rotatable motion into an eccentrically rotatable motion. As the drive pin 101 extends into slot 8, i.e. an elongated hole with its smaller widening in the direction of oscillation of the swing bridge 1, a full rotation of the drive pin 101 may first push the swing bridge 1 to its right side, wherein the webs 6 bent and only the oscillating body 2 of the swing bridge 1 is shifted. Since, the drive pin 101 continues to rotate, the drive pin 101 reaches the bigger widening of the elongated hole, followed by a push of the swing bridge 1 in the opposite direction, i.e. to the left side. Between the transition of the movement of the swing bridge 1 from the right to the left, the webs 6 relax before they are bent again. As the rotatable motion of the drive pin 101 continues, the swing bridge 1 and therefore the second drive shaft 3 continues to oscillate in its longitudinal direction, which operates the cutter unit 201.

As the swing bridge 1 enables an offset between the drive shafts 3 and 103, the electric motor 100 can be assembled within the electrically driven device 300 in an edge portion, close to the side walls of the chassis and/or the housing. Hence, space for a battery unit 102 on the side opposite to the electric motor 100 is created and the use of the available installation space can be optimized.

In addition, the chassis 200 allows an asymmetric assembly, wherein the electric motor 100 and the battery unit 102 are parallel offset to the second drive shaft 3, i.e. a parallel offset between the longitudinal axes I, II and III, which provides for a more balanced overall weight distribution within the electrically driven device 300 and in relation to the second drive shaft 3 of the oscillating body 2.

Consequently, the described assembly of the inventive electrically driven device 300 is particularly suitable for small electrically driven devices, especially for those devices which are used for travelling.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

REFERENCE NUMERALS

- 1 swing bridge
- 2 oscillating body
- 3 second drive shaft (oscillating body)
- 4 first component
- 5 second component
- 6 web
- 7 free end
- 8 slot
- 9 welding dots
- 10 ribs
- 100 electric motor
- 101 drive pin
- 102 battery unit
- 103 first drive shaft (electric motor)
- 104 Printed Circuit Board PCB
- 200 chassis
- 201 cutter unit
- 202 upper wall
- 203 lower wall
- 204 rear wall
- 205 front wall
- 206 lateral side wall
- 300 electrically driven device
- 301 upper housing
- 302 outer housing
- 303 button
- 304 lower housing
- 305 inner housing
- 306 seal
- 307 cap
- 308 seal/o-ring
- I first longitudinal axis
- II second longitudinal axis
- III third longitudinal axis
- V material strength (web)
- W width (web)
- X plane

What is claimed is:

1. An electrically driven device comprising a housing and a chassis, wherein the chassis comprises a plastic skeleton for receiving an electric motor having a first drive shaft, a battery unit, a printed circuit board (PCB) and an oscillating body having a second drive shaft to drive a cutter unit upon movement of the oscillating body, wherein a first longitudinal axis is defined along the second drive shaft, wherein a second longitudinal axis is defined along the first drive shaft with the second longitudinal axis passing through the oscillating body, and a third longitudinal axis is defined through a center of a body of the battery unit, the second longitudinal axis and the third longitudinal axis are parallel and offset to the first longitudinal axis and the second longitudinal axis is offset from the third longitudinal axis, wherein the oscillating body has a corner section and the second drive shaft is located in the corner section, wherein the second drive shaft extends from a side of the oscillating body nearest to the cutter unit and opposite to a side of the oscillating body nearest to the electric motor, wherein the electric motor comprises a drive pin rotatable eccentrically about the second longitudinal axis, wherein the oscillating body comprises an elongated hole for receiving the drive pin, the elongated hole having a smaller widening in a direction of oscillation of the oscillating body.

2. The electrically driven device according to claim 1, wherein the second longitudinal axis and the first longitudinal axis and the third longitudinal axis and the first longitudinal axis are offset by a different offset distance.

3. The electrically driven device according to claim 1, wherein the second longitudinal axis and the third longitudinal axis are offset from the first longitudinal axis in opposite transverse directions.

4. The electrically driven device according to claim 1, wherein the housing and the chassis comprise at least two components.

5. The electrically driven device according to claim 4, wherein the at least two components comprise a soft and a hard component.

6. The electrically driven device according to claim 1, wherein the skeleton of the chassis comprises at least an upper wall, a lower wall, a rear wall and a front wall, wherein the front or the rear wall comprise openings or cavities for receiving the battery unit and the electric motor and wherein the printed circuit board (PCB) is fixed at a lateral side of the chassis.

7. The electrically driven device according to claim 1, wherein the second drive shaft is adapted to be mechanically coupled to the cutter unit.

8. The electrically driven device according to claim 1, wherein the drive pin is adapted to be mechanically coupled to the oscillating body.

9. The electrically driven device according to claim 1, wherein at least one of the housing or the chassis comprises press ribs to secure the motion of the oscillating body in at least one direction.

10. The electrically driven device according to claim 1, wherein the electric motor is secured to at least one of the housing, a housing component, the chassis or a chassis component.

11. The electrically driven device according to claim 1, wherein at least one of the housing, a housing component, the chassis or a chassis component is formed by injection molding.

12. The electrically driven device according to claim 1, wherein the electrically driven device further comprises a cap, wherein the cap is removably attached to the housing or one of housing components, and wherein the cap is at least covering a button to actuate the electrically driven device.

13. The electrically driven device according to claim 1, wherein the electric motor and the battery unit are sealed against moisture penetration, by seals of at least one of the housing, a housing component, the chassis, a chassis component or a cap.

14. The electrically driven device according to claim 1, further comprising two swing arms, wherein the oscillating body, the second drive shaft and the two swing arms define a swing bridge, wherein the oscillating body comprises four quandrants and the second drive shaft is located in one of the four quandrants.

15. The electrically driven device according to claim 1, wherein the second drive shaft extends from the oscillating body toward and is adapted to be mechanically coupled to the cutter unit.

16. The electrically driven device according to claim 1, wherein the oscillating body has a center location and the second drive shaft is located in the corner section away from the center location.

17. An electrically driven device comprising a housing and a chassis, wherein the chassis comprises a plastic skeleton for receiving an electric motor having a first drive shaft extending in a first direction, a battery unit, a printed circuit board (PCB) and an oscillating body having a second drive shaft, wherein the chassis is provided with openings or cavities for receiving the electric motor and the battery unit side by side in a second direction transverse to the first direction and is provided with the printed circuit board (PCB) at a lateral side, also side by side to one of the electric motor and the battery unit, wherein the battery unit is located between the printed circuit board (PCB) and the electric motor, and an axis perpendicular to the first drive shaft of the electric motor passes through the first drive shaft of the electric motor, the battery and the printed circuit board, wherein a first longitudinal axis is defined along the second drive shaft, a second longitudinal axis is defined along the first drive shaft and a third longitudinal axis is defined through a center of a body of the battery unit, wherein the first longitudinal axis is between the second and third longitudinal axes, and wherein the oscillating body and the second drive shaft move with a linear oscillating motion.

18. An electrically driven device comprising a housing and a chassis, wherein the chassis comprises a plastic skeleton for receiving an electric motor having a first rotary drive shaft, a battery unit, and an oscillating body having a main body portion and a second drive shaft extending away from the main body portion and toward a cutter unit to drive the cutter unit upon movement of the oscillating body, the oscillating body having a corner section and the second drive shaft is located in the corner section, wherein a first longitudinal axis is defined along the second drive shaft, wherein a second longitudinal axis is defined along the first drive shaft with the second longitudinal axis passing through the oscillating body, and a third longitudinal axis is defined through a center of a body of the battery unit, wherein the second longitudinal axis and the third longitudinal axis are parallel and offset to one another, wherein the electric motor comprises a drive pin rotatable eccentrically about the second longitudinal axis, the drive pin engaging a hole in the main body portion to cause oscillating movement of the main body portion, the second drive shaft moving in the same direction with the main body portion hole during oscillating movement of the main body portion.

19. The electrically driven device according to claim 18, further comprising two swing arms, wherein the oscillating body, the second drive shaft and the two swing arms define a swing bridge, wherein the oscillating body comprises four quandrants and the second drive shaft is located in one of the four quandrants.

* * * * *